United States Patent Office 3,682,794
Patented Aug. 8, 1972

3,682,794
ELECTROCHEMICAL REDUCTION OF AROMATIC COMPOUNDS
Joseph S. Matthews, O'Hara Township, Allegheny County, Pa., assignor to Gulf Research & Development Company, Pittsburgh, Pa.
No Drawing. Filed May 6, 1971, Ser. No. 141,018
Int. Cl. C07b 29/06; C07c 5/10
U.S. Cl. 204—73 R      20 Claims

ABSTRACT OF THE DISCLOSURE

A process for electrochemically reducing aromatic compounds in the presence of an amine, an ammonium salt or an inorganic acid and a hydrophobic quaternary amine salt.

---

This invention relates to a process for electrochemically reducing aromatic compounds, particularly for electrochemically reducing benzene to 1,4-cyclohexadiene. The mixture being subjected to electrochemical reduction herein, by passing a direct current of electricity therethrough, is a substantially homogeneous, preferably anhydrous, mixture containing an aromatic compound, an amine, an ammonium salt or an inorganic acid and a hydrophobic quaternary amine salt.

The aromatic compound can be naphthalene, alkyl-substituted naphthalenes, benzene or alkyl-substituted benzenes carrying one or two alkyl substituents thereon wherein the alkyl substituents, the same or different, can have from one to four carbon atoms, but preferably is methyl. Examples of such aromatic compounds are naphthalene, alpho-methylnaphthalene, beta-ethylnaphthalene, benzene, toluene, o-, m- or p-xylene, etc. The benzenes are converted principally to 1,4-cyclohexadienes, while naphthalene is reduced principally to 1,4-dihydronaphthalene and eventually to 1,4,5,8-tetrahydronaphthalene.

The amine, which is employed herein as a solvent, can include any amine in which the aromatic compound being reduced is soluble, and can be defined by the following structural formula:

wherein R' can be either hydrogen or an alkyl group having from one to eight carbon atoms, preferably from one to four carbon atoms, and R" can be an alkyl group as defined by R'. Specific examples of amines that can be used are methylamine, ethylamine, butylamine, diethylamine, dibutylamine, etc.

In addition to the above there is also present in the system an inorganic acid soluble in the reaction mixture having an ionization constant above about $1 \times 10^{-5}$, preferably in the range of about $1 \times 10^{-4}$ to about $1 \times 10^{-1}$, or an ammonium salt of said inorganic acid soluble in said mixture. Specific examples of inorganic acids or ammonium salts that can be used are hydrochloric acid, ammonium chloride, ammonium nitrate, ammonium bromide, etc.

Absolutely essential in the reaction mixture in order to carry out the defined reaction with excellent current efficiency to desired compounds is the surfactant amine salt, which can be defined as a hydrophobic quaternary amine salt of an organic or inorganic acid having an ionization constant about $1 \times 10^{-5}$, preferably in the range of about $1 \times 10^{-4}$ to about $1 \times 10^{-1}$, whose cationic portion has a molecular weight above about 170, preferably from about 172 to about 400. Specific examples of such amine salts are cetylpyridinium bromide, hexadecylethyldimethylammonium bromide, tetrahexylammonium chloride, decyltrimethylammonium bromide, tetrabutylammonium bromide, etc.

The amounts of each of the components of the reaction mixture can be varied over a relatively wide range. Thus, based on the total reaction mixture being subjected to reduction herein, the aromatic compound can be present in an amount ranging from about 0.1 to about 50, preferably from about one to about 10 mol percent; the amine from about 40 to about 90, preferably from about 60 to about 80 mol percent; the inorganic acid or the ammonium salt from about one to about 10, preferably from about three to about six mol percent; and the hydrophobic quaternary amine salt from about 0.005 to about one, preferably from about 0.01 to about 0.1 mol percent. Although the mixture being treated is preferably substantially anhydrous, the process can be operated using an aqueous mixture. When water is present the amount thereof relative to the amine can be in the range of about 1:50 to about 2:1, preferably from about 1:20 to about 1:1, on a molar basis.

The pressure and temperature of the mixture during the reaction are not critical. Pressure has no apparent effect on the reaction and, therefore, atmospheric pressure is preferred. Temperatures can be in the range of about 0 to about 50° C., but a temperature in the order of about 10° to about 30° C. is preferred. Time is not critical and is dependent upon the amount of reduction desired.

The amount of current required for electrolysis can also vary over a wide range. Thus, the amount of current supplied to the reaction system can vary from about 0.01 to about 0.3 ampere per square centimeter of cathode surface area, preferably within the range of about 0.05 to 0.2 ampere per square centimeter of cathode surface area. The electrodes employed are carbon electrodes, preferably graphite.

The reaction is simply effected. The reaction mixture defined above is placed in a cell or vessel containing a carbon anode and a carbon cathode and merely involves passing a direct current of electricity therethrough over a designated period of time. If desired, a divided cell can be used, for example, one containing a fritted glass disc divider. This is not preferred, however, because there is a tendency to clog up the cell divider, current efficiency is reduced, electrical resistance increases, more heat is generated, etc. The resultant mixture can then be subjected to simple distillation procedures to recover the desired reduced product.

In order to exemplify the above a number of runs were made in an undivided cell, except for Runs Nos. 6 and 7, defined hereinafter, containing spectroscopic grade graphite rods, each of which had a diameter of six millimeters and a cathode surface area immersed in the reaction of eight square centimeters. The solution during electrolysis was stirred magnetically while it was cooled externally by a water bath. During the runs the temperature was maintained at about room temperature, ±5° C. Current was supplied by a Technipower Model L 160–3M power supply, wherein the voltage (0–160 v.) or current (0–3A) could be regulated. Analysis was made by gas chromatography where possible and peaks, not otherwise identifiable, were identified by mass-gas liquid chromatography or infrared gas liquid chromatography. The results obtained are set forth below in Table I.

TABLE I

| Run No. | Solvent | Ml. | Salt or acid | Gms. | Molar concentration of salt or acid | Surfactant | Mols of surfactant | Mols of benzene | Amps. | Volts | Amp-hours | Mol percent benzene converted | Overall current efficiency | Current efficiency to 1,4-cyclohexadiene | Current efficiency to cyclohexane | Mol percent selectivity to 1,4-cyclohexadiene |
|---|---|---|---|---|---|---|---|---|---|---|---|---|---|---|---|---|
| 1 | H₂O / EDA | 10 / 40 | NH₄Cl | 2.0 | 0.75 | EHDA | 5×10⁻³ | 0.113 | 0.5 | 35 | 2.0 | 11.62 | 36.9 | 35.0 | 1.90 | 95 |
| 2 | H₂O / EDA | 10 / 40 | NH₄Cl | 2.0 | 0.75 | (C₄H₉)₄NBr | 5×10⁻³ | 0.113 | 0.5 | 25 | 2.0 | 23.22 | 72.9 | 70 | 2.90 | 96 |
| 3 | H₂O / EDA | 10 / 40 | NH₄Cl | 2.0 | 0.75 | (C₄H₉)₄NBr | 0.1 | 0.113 | 0.5 | 25 | 2.0 | 25.75 | 80.6 | 78 | 2.63 | 96.7 |
| 4 | H₂O / EDA | 7.5 / 40 | HCl | 4.3 | 2.4 | EHDA | 5×10⁻³ | 0.113 | 0.5 | 22 | 2.0 | 26.14 | 81.8 | 79.2 | 2.60 | 96.8 |
| 5 | H₂O / EDA | 10 / 40 | NH₄Cl | 2.0 | 0.75 | (C₆H₁₃)₄NBr | 5×10⁻³ | 0.113 | 0.5 | 30 | 2.0 | 16.5 | 52.0 | 50.0 | 2.0 | 96.0 |
| 6 | H₂O / EDA | 18 / 80 | HCl | 2.3 | 0.63 | EHDA | 2.5×10⁻² | 0.113 | 0.3 | 80 | 1.8 | 9.6 | 67.0 | 9.2 | 0.4 | 96.0 |
| 7 | H₂O / EDA | 18 / 80 | HCl | 2.3 | 0.63 | EDHA | 1.0×10⁻² | 0.113 | 0.5 | 60 | 1.5 | 16.2 | 70.0 | 15.2 | 1.0 | 94.0 |
| 8 | H₂O / EDA | 50 / 60 | NH₄Cl | 2.0 | 0.75 | (C₄H₉)₄NBr | 0.10 | 0.113 | 0.5 | 32 | 2.0 | 8.80 | 29.8 | 26.4 | 3.4 | 88.6 |
| 9 | H₂O / EDA | 50 / 60 | NH₄Cl | 2.0 | 0.75 | (C₄H₉)₄NBr | 0.75 | 0.113 | 0.5 | 40 | 2.0 | 8.38 | 26.3 | 25.4 | 0.9 | 96.5 |
| 10 | H₂O / EDA | 10 / 40 | NH₄Cl | 2.1 | 0.80 |  |  | 0.113 | 0.5 | 25 | 2.0 | 2.09 | 7.3 | 6.1 | 1.2 | 87.5 |
| 11 | H₂O / EDA | 10 / 40 | NH₄Cl | 2.0 | 0.75 | PE | 0.1 | 0.113 | 0.5 | 25 | 2.0 | <1 | ----- | Trace | ----- | ----- |
| 12 | H₂O / EDA | 10 / 40 | NH₄Cl | 2.0 | 0.75 | EDP | 8×10⁻³ | 0.113 | 0.5 | 25 | 2.0 | 2.54 | 8.6 | 7.8 | 0.8 | 91 |
| 13 | H₂O / EDA | 10 / 40 | NH₄Cl | 2.0 | 0.75 | (CH₃)₄NCl | 5×10⁻³ | 0.113 | 0.5 | 30 | 2.0 | ----- | ----- | ----- | ----- | ----- |
| 14 | H₂O / CH₃OH | 7.5 / 40 | HCl | 4.3 | 2.4 | EHDA | 5×10⁻³ | 0.113 | 0.5 | 7 | 2.0 | ----- | 3.40 | ----- | ----- | ----- |
| 15 | H₂O / (CH₃OCH₂CH₂)O | 10 / 40 | NH₄NBr |  |  | (C₄H₉)₄NBr | 0.1 | 0.113 | 0.5 | 30 | 2.0 | 1.3 | 8.85 | ----- | ----- | ----- |
| 16 | H₂O / (CH₃OCH₂CH₂)O | 10 / 40 | NH₄Br | 3.7 | 0.75 | EHDA | 1×10⁻² | 0.113 | 0.5 | 30 | 1.25 | 1.8 | 2.7 | ----- | ----- | ----- |
| 17 | H₂O / EDA | 10 / 40 | NH₄Cl | 2.0 | 0.75 | (HOCH₂CH₂)₄—NBr | 5×10⁻³ | 0.113 | 0.5 | 30 | 2.0 | <1 | ----- | ----- | ----- | ----- |
| 18 | H₂O / CH₃OH | 5 / 40 | H₂SO₄ | 9.2 | 1.7 | EHDA | 5×10⁻³ | 0.113 | 0.5 | 8 | 2.0 | ----- | ----- | ----- | ----- | ----- |
| 19 | H₂O / CH₃OCH₂—CH₂OCH₃ | 5 / 40 | H₂SO₄ | 9.2 | 1.7 | EHDA | 1×10⁻² | 0.113 | 0.5 | 36 | 2.0 | ----- | ----- | ----- | ----- | ----- |
| 20 | NH₄OH / CH₃OH | 25 / 25 | CH₃COOH | 26.2 / 3.0 | 8.8 / 0.75 | EHDA | 1×10⁻² / 5×10⁻³ | 0.113 | 0.5 / 0.5 | 10 / 10 | 2.0 / 2.0 | 5.7 | 18 | 5.5 | 0.2 | 96 |
| 21 | CH₃OH | 25 |  NH₄NO₃ | 14.4 | 3.0 | EHDA | 5×10⁻³ | 0.113 | 0.5 | 12 | 2.0 | ----- | ----- | ----- | ----- | ----- |
| 22 | H₂O / CH₃OH | 15 / 25 | H₃PO₄ | 4.3 | 2.4 | EHDA | 5×10⁻³ | 0.113 | 0.5 | 18 | 2.0 | 1.0 | 2.6 | ----- | ----- | ----- |
| 23 | H₂O / HOCH₂—CH₂NH₂ | 7.5 / 40 | HCl | 9.9 | 1.5 | EHDA | 5×10⁻³ | 0.113 | 0.5 | 10 | 2.0 | ----- | ----- | ----- | ----- | ----- |
| 24 | H₂O / HCONH₂ | 10 / 40 | (NH₄)₂—HPO₄ |  |  | EHDA | 5×10⁻³ | 0.113 | 0.5 |  |  |  |  |  |  |  |

NOTE.—EDA = Ethylenediamine; EHDA = Ethylhexadecyldimethylammonium bromide; PE = Sulfonic TD 90, a polyethylene oxide.

The data in the above illustrate the advantages of operating in accordance with the process described and claimed herein. Current efficiency referred to in the tables can be defined by the following:

$$\frac{M(D+2T) \times 5360}{A}$$

wherein M equals the mols of aromatic charge, D equals percent dihydro product according to gas chromatography and T equals percent tetrahydro product according to gas chromatography, and A equals ampere hours used. As stated above, each of the runs was carried out in an undivided cell, except Runs Nos. 6 and 7, which were carried out in a similar cell divided into two compartments by means of a fritted glass disc divider. In Run No. 6 HCl, water and EDA were in both chambers, but benzene and EHDA were added to the catholyte. In Run No. 7 the catholyte was the same except that the anolyte was 10 percent H₂SO₄ solution. In Runs Nos. 1 through 9, inclusive, it can be seen that operation in accordance with my invention, especially when the mixture being treated is an aqueous mixture, results in high over-all current efficiencies with excellent selectivity to desired product. The remaining runs also show that when solvents and surfactants not encompassed within the scope of the invention defined herein are used current efficiency is exceedingly low and in some cases no conversion of benzene occurred.

Obviously, many modifications and variations of the invention, as hereinabove set forth, can be made without departing from the spirit and scope thereof, and therefore only such limitations should be imposed as are indicated in the appended claims.

I claim:

1. A process for electrochemically reducing an aromatic compound selected from the group consisting of naphthalene, alkylnaphthalenes, benzene and alkyl benzenes carrying from one to two alkyl substituents on the ring in a vessel containing a carbon anode and a carbon cathode which comprises passing a direct current of electricity through a homogeneous mixture containing said aromatic compound, an aliphatic amine having 1-8 carbons in a chain, an inorganic compound selected from the group consisting of an inorganic acid having an ionization constant above about $1 \times 10^{-5}$ and the ammonium salt thereof and a hydrophobic quarternary amine salt of an organic or inorganic acid having an ionization constant above about $1 \times 10^{-5}$ whose cationic portion has a molecular weight above about 170.

2. The process of claim 1 wherein said aromatic compound is benzene.

3. The process of claim 1 wherein said amine is ethylenediamine.

4. The process of claim 1 wherein said first-named inorganic acid is HCl.

5. The process of claim 1 wherein said ammonium salt is $NH_4Cl$.

6. The process of claim 1 wherein said ionization constant is from about $1 \times 10^{-4}$ to about $1 \times 10^{-1}$ and said molecular weight is from about 172 to about 400.

7. The process of claim 1 wherein the quaternary amine salt is ethylhexadecyldimethylammonium bromide.

8. The process of claim 1 wherein the quaternary amine salt is tetrabutylammonium bromide.

9. The process of claim 1 wherein the quaternary amine salt is tetrahexylammonium bromide.

10. The process of claim 1 wherein the components of the reaction mixture are present in the following molar percentages: from about 0.1 to about 50 percent aromatic compound, from about 40 to about 90 percent amine, from about one to about 10 percent of the first-named inorganic acid or ammonium salt and from about 0.005 to about one percent quaternary amine salt.

11. The process of claim 1 wherein the components of the reaction mixture are present in the following molar percentages: from about one to about 10 percent aromatic compound, from about 60 to about 80 percent amine, from about three to about six percent of the first-named inorganic acid or ammonium salt and from about 0.01 to about 0.1 percent quaternary amine salt.

12. The process of claim 1 in which graphite electrodes are employed in the electrolysis.

13. The process of claim 1 in which water is present in the mixture relative to the aromatic compound in the range of about 1:50 to about 2:1 on a molar basis.

14. The process of claim 1 in which water is present in the mixture relative to the aromatic compound in the range of about 1:20 to about 1:1 on a molar basis.

15. The process of claim 1 in which the temperature of the reaction mixture is from about 0° to about 50° C.

16. The process of claim 1 in which the temperature of the reaction mixture is from about 10° to about 30° C.

17. The process of claim 1 wherein the mixture being subjected to electrolysis contains benzene, ethylenediamine, water, ammonium chloride and ethylhexadecylidimethylammonium bromide.

18. The process of claim 1 wherein the mixture being subjected to electrolysis contains chloride and tetrabutylammonium bromide.

19. The process of claim 1 wherein the mixture being subjected to electrolysis contains chloride and tetrahexylammonium bromide.

20. The process of claim 1 wherein the mixture being subjected to electrolysis contains water, HCl and ethylhexadecyldimethylammonium bromide.

References Cited

UNITED STATES PATENTS

| | | | |
|---|---|---|---|
| 3,485,726 | 12/1969 | Misono et al. | 204—59 |
| 3,488,266 | 1/1970 | French | 204—59 |
| 3,492,207 | 1/1970 | Yang et al. | 204—59 |
| 3,493,477 | 2/1970 | French et al. | 204—59 |

FREDRICK C. EDMUNDSON, Primary Examiner

U.S. Cl. X.R.

204—59 R; 260—667

UNITED STATES PATENT OFFICE
CERTIFICATE OF CORRECTION

Patent No. 3,682,794      Dated August 8, 1972

Inventor(s) Joseph S. Matthews

It is certified that error appears in the above-identified patent and that said Letters Patent are hereby corrected as shown below:

Column 1, line 35, "alpho" should read "alpha".

Column 3, Table I, column 7 of Run 12, "$8 \times 10^{-2}$" should read "$8 \times 10^{-3}$".

Column 3, Table I, column 2 of Run 15, "$NH_4NBr$" should read "$NH_4Br$".

Signed and sealed this 13th day of February 1973.

(SEAL)
Attest:

EDWARD M. FLETCHER, JR.
Attesting Officer

ROBERT GOTTSCHALK
Commissioner of Patents